Oct. 25, 1955  J. R. HOPKINS ET AL  2,721,823
METHOD OF AND PRODUCT FOR REPAIRING PROTECTIVE COATED PIPES
Filed Feb. 24, 1953  2 Sheets-Sheet 1
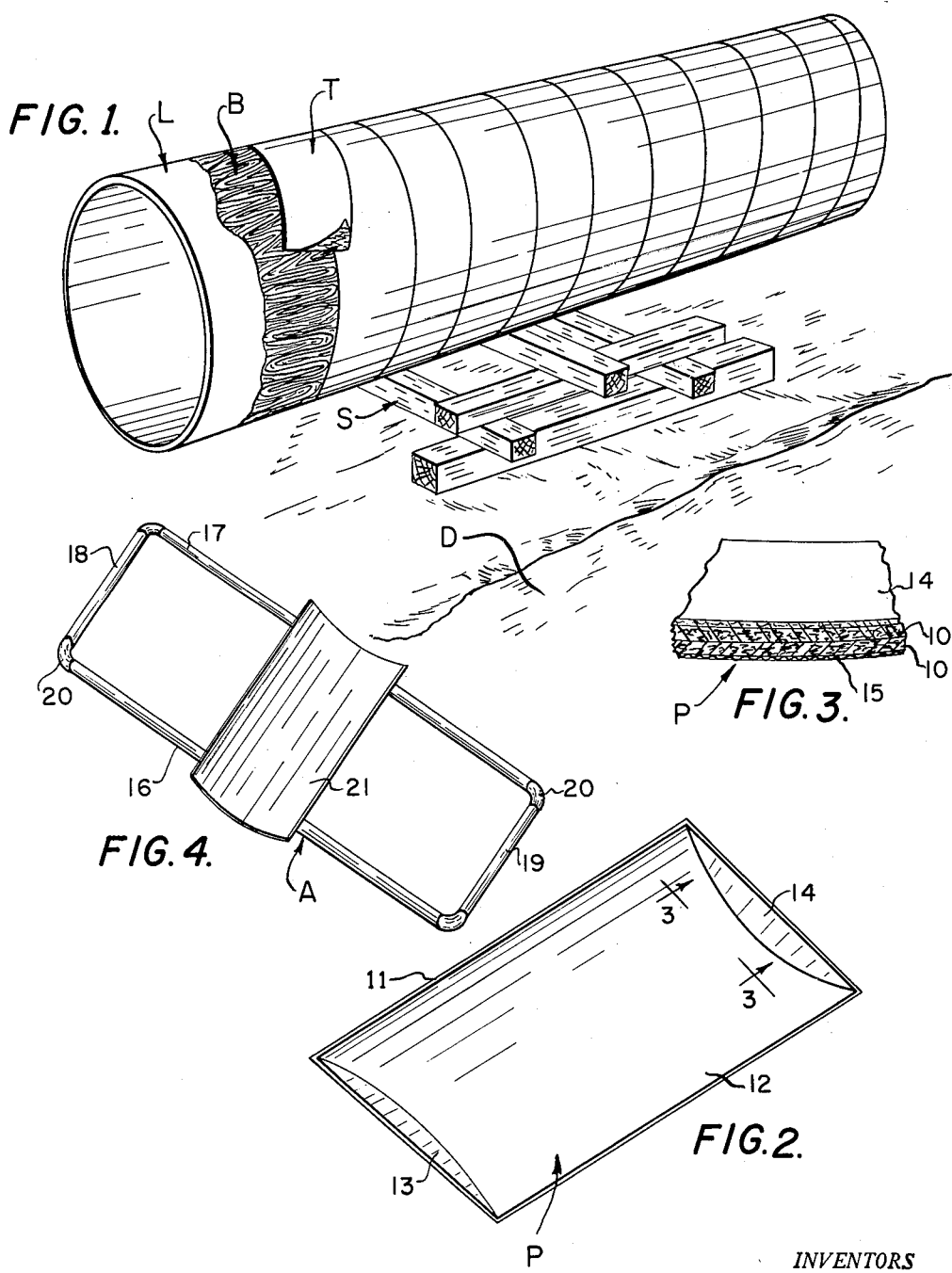
INVENTORS
John R. Hopkins &
Frank E. McNulty
BY
ATTORNEY Oct. 25, 1955   J. R. HOPKINS ET AL   2,721,823
METHOD OF AND PRODUCT FOR REPAIRING PROTECTIVE COATED PIPES
Filed Feb. 24, 1953   2 Sheets-Sheet 2

*INVENTORS*
John R. Hopkins &
BY   Frank E. McNulty

ATTORNEY

United States Patent Office 2,721,823
Patented Oct. 25, 1955

2,721,823

METHOD OF AND PRODUCT FOR REPAIRING PROTECTIVE COATED PIPES

John R. Hopkins, Denver, Colo., and Frank E. McNulty, Tulsa, Okla.

Application February 24, 1953, Serial No. 338,398

7 Claims. (Cl. 154—104)

Our invention relates to an improved method of and product for protecting pipe and particularly pipe which is to be placed under ground, such as in pipelines for transmitting fluid from one point to another, examples being a natural gas transmission pipeline or an oil or other fuel liquid transmission pipeline.

Transmission pipelines are made up from sections of pipe welded together. First, the sections of pipe are distributed along the right of way for the pipeline. Next, the trench is dug. Following this the sections of distributed pipe are welded together and then supported on spaced skids alongside the dug trench which is to receive the pipeline. The joined pipe sections are then cleaned in preparation for the protective coatings. These protective coatings vary, due to the local conditions to be met, but generally a primer is first put on and this is followed by a coat of hot enamel which may be either of an asphalt or coal tar base. Over this coating is provided a wrapping in the form of a tape, which may vary in width and is generally done spirally. The tape can be made from different inorganic material such as glass mat or felt material. The coating and wrapping is done by a single machine and after such is completed the pipe is again allowed to rest on skids and remain there over night so the enamel can set. As the pipe is positioned on the skids, the coating is still hot and the great pressure of the pipe squeezes and damages the coating. Also during the setting period the pipe will contract and this may cause additional damage. This must be repaired after the pipe is lifted off the skids and before it is placed in the trench by suitable machinery. If this were not done, then there would soon be deterioration of the pipe at the damaged spot of the coating and subsequent leakage on the pipeline.

The present method of doing this repairing is to place additional hot coating material on a flexible elongated sheet. This sheet is positioned beneath the pipe and when the ends are grasped by two workers and pulled back and forth while partly wrapped around the pipe, the coating material will be smeared over the spot to be repaired. This present method results in a high cost for repairing, and further does not assure a good job of repairing unless extreme care and considerable time is consumed by the repair operators. One reason for the high cost is that the repairing takes more time than the lifting of the pipe and placing it in the trench. Consequently, expensive lifting machinery and the crew thereof will be idle, thereby making unnecessary overhead. Also, this present method involves excessive waste of enamel material which also increases cost and overhead. Many times the "swabbing on" (also called "granny ragging" by the pipeline makers) of the repair coating is sloppy and the damaged spot is not properly repaired. A poor patch job thus may result in a leak in a relatively short period of time, due to the action of the elements affecting the pipe material through the defective patch.

One of the objects of our invention is to produce a new method of making the repair job on a pipeline structure which has had its coating damaged because of resting on skids or other supports prior to placing in a trench.

Another object is to produce an improved method and product for accomplishing a repair job on coated pipe of the kind referred to which will permit the repairing to be done quickly and efficiently and at a minimum of cost without slowing up the work of the pipeline laying machinery and crews.

Yet another object is to produce an improved "patch" product that can be quickly applied to a coated pipe to repair a damaged place of the coating and when applied will remain firmly sealed to the pipe coating and assure that the entire damaged place is efficiently repaired.

Still another object is to produce a patch structure for coated pipe, which patch structure will be so constructed that it can hold on its surface to be engaged with the pipe coating a liquid sealing material, yet the construction will be such that there will be no interference with the accomplishing of a complete sealing engagement between the full surface of the patch and the curved surface of the pipe at the place to be repaired.

Other objects of our invention will become apparent from the following description of our improved method and the novel product employed in carrying out the method, all taken in connection with the accompanying drawings in which:

Figure 1 is a view of a coated portion of a pipeline positioned on skids alongside of a trench and illustrating how the coating becomes damaged during setting of the coating;

Figure 2 is a perspective view of the patch showing its construction prior to application;

Figure 3 is a sectional view through the path showing details of construction, said view being taken on the line 3—3 of Figure 2;

Figure 4 is a perspective view of a suitable tool which can be employed in applying the patch;

Figure 5:
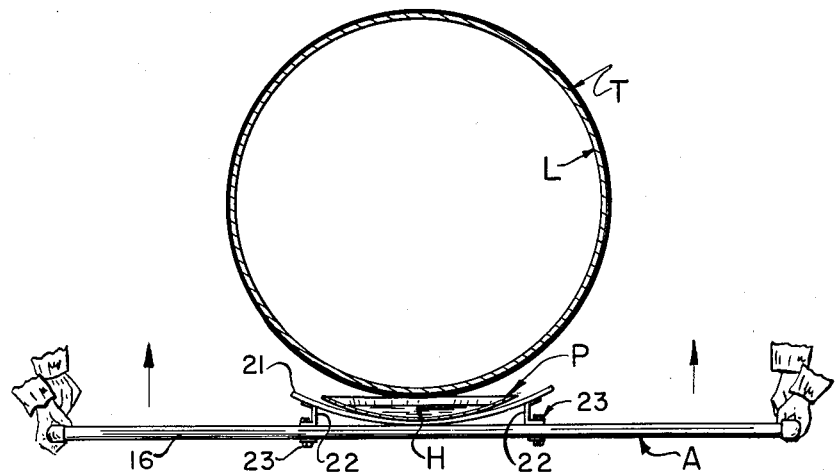
Figure 5 is a view showing the patch being applied, the pipe patch and applying tool all being shown in section.

Referring to the drawings in detail and first to Figure 1, there is disclosed a portion of a pipeline L which is made up from a plurality of pipe sections welded together alongside of a trench D into which the pipeline is going to be laid and covered. The pipeline will extend across country to carry most any kind of fluid from one place to another. The pipeline may carry natural gas from a gas field to a consuming area or it may carry crude oil from an oil producing field to a refinery, or still further it may carry refined oil products, such as gasoline, from the refinery to various distributing points. After the sections of pipe have been welded together to form the pipeline alongside of the dug trench, the piping will be provided with a protective coating to guard it against action of the elements. This coating is generally made from coal tar, asphalt or some other bituminous material, although it may be made from other substances. After cleaning the pipe, the bituminous material is spread, which is in a hot liquid condition, directly on the pipe, this material being shown at B in Figure 1. Immediately after applying the hot liquid, generally called an enamel coating, the pipe has wrapped thereon a tape T which generally consists of some inorganic sheet material such as glass mat, felt or the like, and this tape may or may not be impregnated with a bituminous substance which would be substantially the same as the enamel which is spread on the pipe. The spreading on of the hot enamel and the wrapping of the pipe with tape is done by a machine and, as soon as this is accomplished, the pipe is laid on skids indicated at S and positioned alongside of the trench preparatory to moving the pipe into the trench. The skids can be a plurality of wooden beams arranged in crossed relation, as shown.

When the pipe is placed on the skids, the heavy weight of the pipe squeezes and damages the coating which is still hot. In some instances the damage is such that the pipe is completely exposed. Before the pipe can be moved into the trench, it must stand for a while to allow the enamel to set and this is generally done by leaving the pipe over night in its position on the skids. As the enamel cools and the pipe contracts, because of the coolness of the atmosphere at night, there will be some movement of the pipe on the timbers forming the skid and consequently additional damage may be caused to the protective coating comprising the enamel and the tape. All this damage must be repaired before the pipe is laid in the trench.

To repair this damage in accordance with our invention, we provide a patch member P. This patch is prefabricated into a structure disclosed in Figures 2 and 3. The patch is preferably made up from several layers of sheets 10, shown as two in Figure 3, although more or fewer may be used as conditions require. Each sheet will be formed from suitable inorganic structures such as, for example, glass fibers or asbestos fibers, preferably in the form of sheets, and a bituminous material which may be either asphalt or coal tar having such characteristic as to produce a relatively stable and rigid patch capable of maintaining a shaped form, unless acted on by external forces. The sheets will be pressed together under some heat and pressure to form the patch member. As is disclosed in Figure 3, the patch is formed to have a body portion 11 which will have a cylindrical top surface 12, the curvature of which will be such as to conform substantially with the curvature of the wrapped pipe.

The body portion will generally be rectangular in shape, although it may take other shapes. The ends of this body portion will be turned up to provide end walls 13 and 14 projecting above the curved surface 12. These end walls, together with the curved surface, will thus form a receptacle in the form of a shallow curved bottom trough, making it capable of holding material in such liquid form as to be capable of flowing. The body portion in its curved condition and the end walls are all shaped by suitable operation with a mould and when the structure is cooled it will retain this shape. The ends will be an integral part of the sheet or sheets 10 and at each end of surface 12 they follow the shape of the curvature thereof, and during moulding these ends will be so turned up that they will flare outwardly as indicated. This flaring will be such as to permit the end walls to be compressed or "broken down" away from the curved body portion of the patch when the patch is applied in a manner to be later described. Although the sheets of material in their moulded form are relatively rigid and stable, the turned up end portions nevertheless can be easily broken down so that the curved surface of the patch can fit up and fully engage with the curved surface of the coated pipe. If it is desired that the patch have a base surface on its bottom side that will be protected, this side can be provided with a sheet of asbestos felt indicated at 15. With this felt base sheet, any member which engages the bottom side of the patch will be prevented from sticking thereto, even though the material of the patch may be sticky or caused to become sticky by a heat condition. Also, by the felt base, the patches can be readily packed in nested relation for shipping without the patches becoming stuck together.

To apply the patch, an applicating tool is employed and a suitable one is shown in Figure 4, generally indicated by the letter A. It comprises a rectangular frame structure formed from pipe. This frame structure has parallel side pipes 16 and 17 and end connecting pipes 18 and 19. The end and side pipes are joined together by elbows 20, as shown. The frame structure is of such length that when positioned beneath a pipe, the ends will extend outwardly some distance on each side of the pipeline so that the end pipes 18 and 19 can be easily grasped by workmen standing on opposite sides of the pipeline. On the central part of the frame structure of the applicating tool A is a plate 21 made of steel or other suitable material and formed to have substantially the same curvature as that of the patch and the pipe. The plate is preferably of a size at least as large as the patch. To mount the plate on the frame structure, the four corners of the plate carry on their under side brackets 22 which are welded thereto (see Figure 5). These brackets are arranged to be connected by suitable bolts 23 to the side members of the frame. Thus, if it is desired, the curved plate 21 can be changed so that different size and curvature of plates can be attached to the frame to take care of different shaped and different curved patches.

With this applicating tool, which may also be called a "cradle applicator," the patch can be quickly and easily applied. The applying of this patch is done when the pipeline is raised off the skids preparatory to placing the pipeline in the trench with the use of heavy pipe laying machinery. When the pipeline is raised off the skids, the applicator will be placed beneath the pipeline, as indicated in Figure 5, and a patch will be placed in the curved plate 21 of the applicating tool with the felt base bottom of the patch resting on the top of the curved plate 21. Into the patch will now be poured bituminous material, indicated at H in Figure 5, so heated as to be in a flowing condition. The material may be either asphalt or coal tar and preferably the same as the enamel B which was placed on the pipe prior to wrapping with the tape. Since the curved body portion of the patch is provided with the end walls, there will be a receptacle for receiving this hot material and containing it on top of the curved surface of the patch. The hot material on the top of the patch will tend to soften the patch, at least that portion next to the curved top surface. After the material is poured onto the top of the patch, the two men at the ends of the applicating tool will pull upwardly and in doing this, the top edges of the two end walls of the patch will engage the bottom of the pipe on opposite sides of the damaged section. By continued force, these ends will be turned and/or broken away from the main body of the patch and assume a position where they no longer extend above any part of the curved surface 12 of the patch. The continued application of force by the applicator through the plate 21 against the patch will force the patch into tight engagement with the coating on the pipe and the pipe proper if it is exposed.

Figure 6:
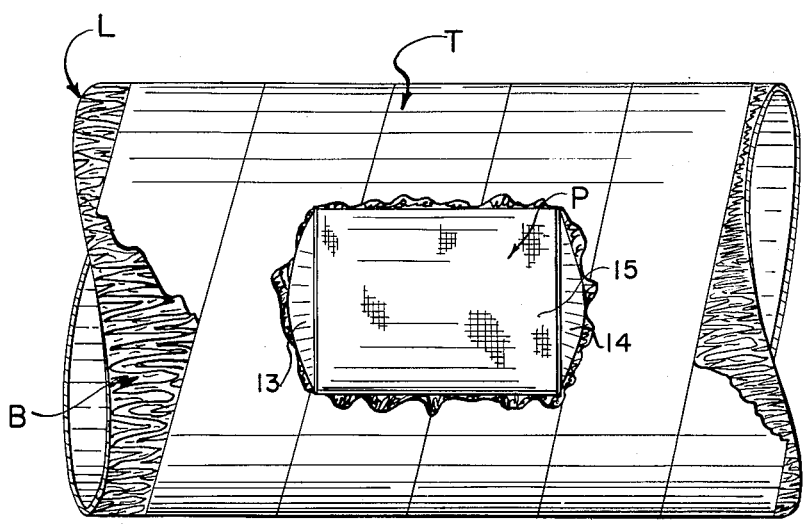
Figure 6 is a bottom view of the patch after application with the pipeline portion which has had its coating damaged.

Since the curved surface 12 of the patch has substantially the same curvature as the pipe, there will be a complete squeezing action on the hot material on the top of the patch, with the result that this material will be forced out in all directions so the entire curved surface of the patch will be adhered to the tape surface of the pipe and a good tight sealing action accomplished, all as illustrated in Figure 6. During the application of pressure to break down the end walls and bring the curved surface of the patch into full adhering engagement with the pipe, the applicating tool can be rocked up and down as pressure is applied. This will make a good distribution of the pressure over all the bottom of the patch and assure that all sections of the patch will be fully adhered to the protective coating of the pipe. With the material of the patch softened by the hot material, the enamel which is in the wrapping tape will also be softened when the patch is pressed into position, and the result will be a "welding" action with a homogeneous section from the patch to the pipe coating. It will be seen that the application of the patch can take place in a very short period of time, without any danger of a poor repair job. Furthermore, with the patch there is provided an extra heavy coating at the damaged area, which assures there will be no break down of the coating at this point, as is often the case when the repairing is done by the old method of attempting to coat over the damaged part with bituminous material applied by a flexible member as previously described.

Being aware of the possibility of use of different types of patches made from different but equivalent material than the patch described, and also the use of modified forms of applicating tools, all without departing from the fundamental structure involved and also the fundamental steps of making the repair of a coated pipe, we desire it to be understood that the scope of our invention is not to be limited except in accordance with the appended claims.

What is claimed is:

1. A new method of repairing in the field the protective coating of a cylindrical pipeline which comprises providing a relatively rigid patch member made from inert material having an affinity to the coating and being in the form of a sheet having a normally stable curved top surface substantially the same as the curvature of the pipe to be repaired and outwardly flared upstanding end walls following the shape of the curvature of said surface and defining with the surface a receptacle in the form of a shallow curved trough with said end walls being displaceable and compressible under pressure so that the curved surface can fully engage the coated pipe, placing in the receptacle portion of the patch member a substance in liquid form which will have an affinity to both the coating and the patch material so as to cause the patch to adhere and seal to the protective coating, then applying such forces to the patch member on its side opposite the curved surface when said curved surface is in juxtaposed relation to the coated pipe surface to be repaired that the end walls will be caused to be deformed and subsequently the adhesive substance caused to flow by a squeezing action so as to cover the said curved surface and the pipe and then by the application of pressures on large areas of the bottom of the patch cause the entire patch to adhere to the pipe coating.

2. A new method of repairing in the field the protective bituminous coating of a cylindrical pipeline which comprises providing a relatively rigid patch member made from an inorganic substance and bituminous material and being in the form of a sheet having a normally stable curved top surface substantially the same as the pipe to be repaired and further constructed at its ends to have compressible upstanding outwardly flared wall means following the shape of curvature of said surface to form a shallow trough for a flowable adhering material, placing on the curved surface of the patch member a bituminous substance in liquid form which will adhere and seal the patch to the protective coating, then applying such forces simultaneously to all portions of the patch member on its side opposite the curved surface as to cause the end wall means to be deformed to fit the pipeline surface and the adhesive substance to flow by a squeezing action and cover all the said curved surface and wall means and the opposed pipe coating and thereby adhere the entire patch including all its curved surface and the wall means to the pipe coating without substantially changing the stable condition of its curved surface.

3. A new method of repairing in the field the bottom of protective coating on a pipeline which comprises providing a patch member of material having an affinity to that of the coating of the pipeline, said patch member being constructed to have a body portion provided with a curved top surface conforming to the curvature of the pipe line, sides and ends and a compressible end wall integrally mounted to, and upstanding in an outwardly flared direction from, the body portion at each end thereof and following the shape of the curvature of said surface to form therewith a shallow trough for flowable material, placing on said top surface a hot flowable material having an affinity to that of the protective coating and the patch material and then placing the patch and flowable material against the pipe and applying to the patch substantially uniform pressure over the bottom to thereby cause the end walls to be compressed and the hot flowable material to spread between the pipe and patch by a squeezing action and then uniting the patch to the protective coating needing repair by the application of pressure at different points on the bottom of the patch.

4. A formed patch member for repairing in the field the damaged coating of a pipeline, the member including material chemically compatible with the coating, comprising a body portion provided with a curved top surface generally conforming to the curvature of the pipeline, said curved surface having sides and ends, and an end wall integrally mounted to the body portion at each end and following the shape of the curvature of said surface at each end thereof so as to form with the body portion a receptacle in the form of a shallow curved trough for holding a flowable material having an affinity to the coating and member, said end walls flaring outwardly from the body portion.

5. A formed patch member as defined in claim 4 wherein the body portion is substantially rectangular and said walls are connected to the body portion in a manner that they can be compressed by the application of a force to bring the curved surface into juxtaposition with the pipe wall.

6. A formed patch member for repairing in the field the damaged bituminous coating of a pipeline, the member being relatively stable and rigid and made from bituminous material chemically compatible with the coating comprising a generally rectangular body portion provided with a curved top generally conforming to the curvature of the pipe line, said body portion having ends and sides, and an end wall integrally mounted to, and upstanding from in an outwardly flared direction, each end of the body portion so as to form with the body portion a receptacle in the form of a shallow curved trough for holding a flowable material having an affinity to the coating and member, said outwardly flaring end walls being compressible when force is applied to said member to bring the curved surface into contact with the pipe wall.

7. A formed patch member as defined in claim 6 wherein the bituminous material has embedded therein fibrous structure to give stability thereto and the bottom of the member has adhered thereto a sheet of protecting material.

References Cited in the file of this patent

UNITED STATES PATENTS

| | | |
|---|---|---|
| 2,347,324 | Johnson | Apr. 25, 1944 |
| 2,613,397 | Borkland | Oct. 14, 1952 |
| 2,626,873 | Allen | Jan. 27, 1953 |
| 2,639,252 | Simon et al. | May 19, 1953 |

OTHER REFERENCES

Plastic Car Body in Production, article published in Modern Plastics, for April 1952, pages 96–99.

"Fiberglas Mat," article by Perry E. Miller, published in Am. Roofer for December 1946, pages 12, 13 and 25–28.